(12) United States Patent
Kratzer et al.

(10) Patent No.: US 8,747,525 B2
(45) Date of Patent: Jun. 10, 2014

(54) COMPOSITE HOLLOW CERAMIC FIBERS, PRECURSORS FOR, METHODS OF MAKING THE SAME, AND METHODS OF USING THE SAME

(75) Inventors: Dean W. Kratzer, Warwick, MD (US); Tao Li, Garnet Valley, PA (US); Madhava R. Kosuri, Newark, DE (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 336 days.

(21) Appl. No.: 13/174,682

(22) Filed: Jun. 30, 2011

(65) Prior Publication Data

US 2013/0000488 A1    Jan. 3, 2013

(51) Int. Cl.
| | | |
|---|---|---|
| *B01D 69/08* | (2006.01) | |
| *B01D 53/22* | (2006.01) | |
| *B01D 71/02* | (2006.01) | |
| *B28B 3/20* | (2006.01) | |

(52) U.S. Cl.
USPC ............. 96/10; 96/8; 96/11; 95/54; 95/55; 264/45.9; 264/109; 264/122; 264/634

(58) Field of Classification Search
USPC ......... 96/8, 10, 11; 95/45, 54, 55; 264/43, 44, 264/45.9, 109, 122, 632, 634
See application file for complete search history.

(56) References Cited

U.S. PATENT DOCUMENTS

| | | | |
|---|---|---|---|
| 3,458,615 A | | 7/1969 | Bragaw, Jr. et al. |
| 4,268,278 A | * | 5/1981 | Dobo et al. ................ 96/10 |
| 4,493,629 A | | 1/1985 | Goffe |
| 4,948,763 A | * | 8/1990 | Hayashida et al. ......... 264/82 |
| 5,085,676 A | | 2/1992 | Ekiner et al. |
| 5,799,960 A | | 9/1998 | Davis, Sr. |
| 6,875,528 B1 | | 4/2005 | Nagai et al. |
| 8,075,671 B2 | * | 12/2011 | Zhou et al. ................ 96/10 |
| 2006/0127656 A1 | * | 6/2006 | Gallo et al. ............... 428/212 |
| 2009/0169884 A1 | | 7/2009 | Ekiner et al. |
| 2010/0018394 A1 | | 1/2010 | Ekiner et al. |

FOREIGN PATENT DOCUMENTS

GB    830 441    3/1960

OTHER PUBLICATIONS

Othman, Mohd et al., "Single-step fabrication and characterisations of electrolyte/anode dual-layer hollow fibres for micro-tubular solid oxide fuel cells", Journal of Membrane Science, Feb. 2010, vol. 351, pp. 196-204.*

(Continued)

*Primary Examiner* — Jason M Greene
(74) *Attorney, Agent, or Firm* — Christopher J. Cronin (57) ABSTRACT

A composite hollow ceramic fiber includes a porous hollow core supporting a thin, dense sheath. The non-gas-tight core comprises a first ceramic compound and an interconnecting network of pores. The gas-tight sheath comprises a second ceramic compound. The fiber is made by extruding first and second suspensions of the first and second ceramic compounds in polymeric binders and solvent from a spinnerette and coagulating the nascent hollow fiber to effect phase inversion of the polymeric binders. The resultant green fiber is sintered in a two step process. First, the binder is burned off. Second, the sheath is densified and the second ceramic compound is sinter without fully sintering the first ceramic compound. The first ceramic compound has a melting point higher than that of the second ceramic compound.

22 Claims, 1 Drawing Sheet

(56) References Cited

OTHER PUBLICATIONS

International Search Report and Written Opinion for PCT/US2012/044595, mailed Oct. 9, 2012.
International Search Report and Written Opinion for PCT/US2012/048947, mailed Oct. 9, 2012.

Othman, et al., "Single-step fabrication and characterisations of electrolyte/anode dual-layer hollow fibres for micro-tubular solid oxide fuel cells," Journal of Membrane Science, 351 (2010), pp. 196-204.
Wu, et al., "A dense oxygen separation membrane deriving from nanosized mixed conducting oxide," Journal of Membrane Science, 291 (2007), pp. 172-179.

* cited by examiner

COMPOSITE HOLLOW CERAMIC FIBERS, PRECURSORS FOR, METHODS OF MAKING THE SAME, AND METHODS OF USING THE SAME

CROSS-REFERENCE TO RELATED APPLICATIONS

None.

BACKGROUND

The use of membranes for separation of mixtures of liquids and gases is well-developed and commercially very important art. Such membranes are traditionally composed of a homogeneous, usually polymeric composition through which the components to be separated from the mixture are able to travel at different rates under a given set of driving force conditions, e.g. trans-membrane pressure and concentration gradients. Examples are the desalination of water by reverse osmosis, separation of water/ethanol mixtures by pervaporation, separation of hydrogen from refinery and petrochemical process streams, enrichment of oxygen or nitrogen from air, and removal of carbon dioxide from natural gas streams. In each separation, the membranes must withstand the conditions of the application, and must provide adequate flux and selectivity to be economically attractive.

One type of membrane that may be used to separate oxygen from non-oxygen gases or hydrogen from non-hydrogen gases is made of a solid electrolyte material. A solid electrolyte is an inorganic crystalline material that, while being impermeable to gases, has the property of conducting oxygen ions ($O^{2-}$) or protons ($H^+$) through voids in its crystalline structure. In order to maintain electric charge neutrality, certain solid electrolyte membranes must include a separate electron-conductive path. Other solid electrolyte membranes are made of materials that, at elevated temperatures, can simultaneously conduct oxygen ions and electrons or simultaneously conduct protons and electrons. Examples of these oxygen ion conductive materials include certain perovskites such as $La_xSr_{1-x}CoO_{3-y}$, $La_xSr_{1-x}FeO_{3-y}$, and $La_xSr_{1-x}Fe_yCo_{1-y}O_3$, are examples of mixed conductors. One example of a proton conductive material is a cermet, a composite of metal and sintered ceramic. Other examples of proton conductive materials include the single-phase mixed metal oxide materials of the formula: $AB_{1-x}B'_xO_{3-y}$ wherein A is selected from Ca, Sr or Ba ions, B is selected from Ce, Tb, Pr, or Th ions, B' is selected from Ti, V, Cr, Mn, Fe, Co, Ni, Cu, Al, Ga, or In ions (or combinations thereof), x is greater than or equal to 0.02 and less than or equal to 0.5, and y is such that the electrical neutrality of the crystal lattice is preserved. These oxygen ion or proton conductive membranes are often called mixed oxide conducting membranes.

Other terms used to describe these membranes include mixed ion and electron(ic) conducting membranes, mixed proton and electron(ic) conducting membranes, ion transport membranes, oxygen transport membranes, hydrogen transport membranes, solid state membranes, mixed conducting metallic oxide, and mixed conducting multicomponent metallic oxide membranes. Regardless of the name utilized, these materials have the ability to transport oxygen ions ($O^{2-}$) or protons ($H^+$) through their crystalline structure.

Using oxygen conductive mixed oxide conducting membranes as an example, at elevated temperatures, the mixed oxide conducting material contains mobile oxygen ion vacancies that provide conduction sites for transport of oxygen ions through the material. At the surface of the membrane exposed to the higher $O_2$ partial pressure gaseous atmosphere, the molecular oxygen in the gaseous atmosphere adjacent the surface reacts with electrons and the oxygen vacancies in the crystalline structure of the material to product oxygen ions $O^{2-}$. The oxygen anions diffuse through the mixed conductor material to the opposite surface of the membrane exposed to the lower $O_2$ partial pressure. At the opposite surface, the oxygen anions give up their electrons and form molecular oxygen. The molecular oxygen then diffuses into the gaseous atmosphere adjacent the surface of the membrane exposed to the lower $O_2$ partial pressure gaseous atmosphere. These materials transport oxygen ions selectively, and assuming a defect-free membrane and lack of interconnecting pores, they can act as a membrane with an infinite selectivity for oxygen.

Proton conductive mixed oxide conducting membranes operate in much the same way. At the surface of the membrane exposed to the higher $H_2$ partial pressure gaseous atmosphere, hydrogen molecules disassociate into protons and electrons which migrate through the membrane to the opposite surface where they recombine into hydrogen molecules. The thus-formed hydrogen molecules then diffuse into the gaseous atmosphere adjacent the membrane surface. Similar to oxygen conducting mixed oxide conducting membranes, these proton conducting membranes offer the possibility of infinite selectivity for hydrogen.

Mixed oxide conducting membranes have been successfully made in flat or planar shapes and large cylindrical tubes (with outer diameters of greater than 1 cm), but have had limited commercial success because of their relatively low surface area compared to small-diameter (for example, an outer diameter/inner diameter of 670/490 microns) hollow fibers.

Large cylindrical tubes may be distinguished from small-diameter hollow fibers not only on the basis of size, but also in their manner of manufacture. Larger diameter tubes are typically made by extrusion through a die of, or cast from, a composition having a very high solids content and very low solvent/dispersant content. This is done in order to provide the rigidity necessary for such structures to avoid collapse after being extruded or being removed from the cast.

As an example of small-diameter hollow fibers, US 20090169884 discloses that they may be made by injection of a relatively high solvent content suspension (e.g. 10-33% or even 20-25% by weight of the suspension) through an annulus of a hollow fiber spinnerette and injection of a bore fluid from a bore on the inside of the spinnerette annulus. Preferred polymers are copolymers having both soft and hard segments. The nascent fiber is passed through a short air gap and directly into a coagulating fluid to facilitate phase change of the polymeric binder in the suspension. The coagulated fiber exhibits excellent processability and may be drawn and wound on a take-up roll, drum, spool, or bobbin.

During the production of mixed oxide conducting membranes, the unsintered, or "green", plate, tube, or fiber is subjected to a heat treatment to pyrolize the binder and sinter the ceramic material to yield a dense, monolithic structure of very low porosity. These fibers are variously described as non-porous or micro-porous. The degree of porosity may vary from across one surface of the membrane to the other, but the pores do not interconnect.

Mixed oxide conducting membranes can be placed in two major groups: those that conduct oxygen ions and those that conduct protons. Membranes from the first group are typically used to separate oxygen from gas mixtures containing oxygen or to product oxygen for reaction with a feedstock, for example, light hydrocarbons such as methane, natural gas, or ethane. Membranes from the second group are typically used to separate hydrogen from gas mixtures containing hydrogen, such as syngas. Regardless of whether they conduct oxygen ions or protons, mixed oxide conducting membranes appear to be well suited for oxygen or hydrogen production or separations since they can be operated in a pressure driven mode. Thus, production of oxygen (or production of the reaction product of oxygen and light feedstock) or hydrogen is driven by the difference in the partial pressure of the gas of interest between the two sides of the membrane.

Mixed oxide conducting membranes must exhibit a variety of mechanical and physical properties in order to withstand handling during processing into gas separation modules and also provide a desirable operational lifetime while maintaining a suitable level of performance under operating conditions. More particularly, they should have sufficient strength to resist cracking during formation of the eventual gas separation module from the component fibers. Fibers of especially small diameters are especially susceptible to breaking during handling. They should also be capable of withstanding elevated pressure differentials and elevated oxygen, hydrogen, carbon monoxide, carbon dioxide, moisture, or other chemical conditions without significant loss in its oxygen ion or proton transport ability. However, mixed oxide conducting materials exhibit different degrees of these mechanical and physical properties. For example, many mixed oxide conducting materials exhibit excessive creep at elevated temperature which may cause the membrane to deform and ultimately crack under certain pressures.

Relatively thin solid electrolyte films are highly desirable because the ideal oxygen flux is inversely proportional to the thickness of the mixed conductor material. Thus thinner films could lead to higher oxygen fluxes, reduced surface areas, lower operating temperatures, and smaller oxygen partial pressure differentials across the mixed conductor material.

Although solid state electrolyte membranes present the possibility for infinite selectivity, there is a tradeoff between flux and mechanical strength. As the thickness of the solid electrolyte material is decreased, the mechanical strength correspondingly decreases. Because a solid state electrolyte membrane must possess a minimum amount of strength to withstand manufacture, handling, and operation (especially in reactive environments), there is a limit to how much the thickness may be decreased. On the other hand, as the thickness is increased in order to provide the necessary mechanical strength, flux suffers.

Thus, it is an object of the invention to provide a solid state electrolyte membrane that exhibits both satisfactory flux and mechanical strength. It is a further object of the invention to provide a ceramic membrane that avoids delamination and/or cracking of the formed dense, non-porous separation layer.

SUMMARY

There is disclosed a process for making a composite hollow fiber, comprising the following steps. A first suspension is prepared comprising the first polymeric binder, particles of the first ceramic compound, a solvent, and optionally particles of the second ceramic compound. A second suspension is prepared comprising the second polymeric binder, particles of the second ceramic compound, the solvent, and optionally particles of the first ceramic compound. A spinnerette is provided that is adapted and configured to continuously extrude one or more nascent hollow fibers comprising a hollow core formed from the first suspension and a sheath surrounding the core formed from the second suspension. The nascent hollow fiber is immersed in a liquid coagulant to facilitate phase inversion of the first and second polymeric binders. The second ceramic compound is a mixed oxide conductor. The first ceramic compound has a melting point higher than that of the second ceramic compound. The first and second polymeric binders are the same or different.

There is also provided a composite hollow fiber made by the foregoing process for making a composite hollow fiber, wherein: the hollow core comprises a composite matrix of the first polymeric binder and the particles of the first ceramic compound; and the sheath comprises a composite matrix of the second polymeric binder and the particles of the second ceramic compound.

There is also a method of making a composite hollow ceramic fiber, comprising the following steps. The foregoing composite hollow fiber is heated under conditions sufficient to drive off the first and second polymeric binders. The binderless hollow fiber is heated under conditions sufficient to densify the sheath to gas-tightness and sinter the second ceramic compound, but not fully sinter the first ceramic compound.

There is also provided a composite hollow ceramic fiber produced by the foregoing method of making a composite hollow ceramic fiber.

Any of the foregoing process, fibers, or method may include one or more of the following aspects:

- about 65 wt. % to about 80 wt. % of the first suspension is made up by the particles of the first ceramic compound and the optional second ceramic compound and about 8 wt. % to about 12 wt. % of the first suspension is made up by the first polymeric binder.
- about 64 wt. % to about 80 wt. % of the second suspension is made up by the particles of the second ceramic compound and the optional first ceramic compound and about 8 wt. % to about 12 wt. % of the second suspension is made up by the second polymeric binder.
- the process of making a composite hollow fiber further comprises passing the nascent hollow fiber from the spinnerette through an air gap.
- the second suspension further comprises pore formers insoluble in the solvent.
- the second ceramic compound is a hydrogen conducting mixed oxide conductor.
- the second ceramic compound is an oxygen conducting mixed oxide conductor.
- the second ceramic compound is a perovskite independently selected from formula (I):

$$[Ma_{1-x-u}Ma'_xMa''_u][Mb_{1-y-v}Mb'_yMb''_v]O_{3-\delta} \qquad (I)$$

in which:
  Ma represents an atom chosen from scandium, yttrium, or from the families of lanthanides, actinides or alkaline-earth metals;
  Ma', which is different from Ma, represents an atom chosen from scandium, yttrium or from the families of lanthanides, actinides or alkaline-earth metals;
  Ma", which is different from Ma and Ma', represents an atom chosen from aluminum (Al), gallium (Ga), indium (In), thallium (Tl) or from the family of alkaline-earth metals;
  Mb represents an atom chosen from transition metals;
  Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
  Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0 < x \leq 0.5$;
$0 \leq u \leq 0.5$;
$(x+u) \leq 0.5$;
$0 \leq y \leq 0.9$;
$0 \leq v \leq 0.9$;
$0 \leq (y+v) \leq 0.9$; and
w is such that the structure in question is electrically neutral.

the second ceramic compound is $La_{1-x}Sr_xFe_{1-y}Co_yO_{3-\delta}$.
the first ceramic compound is $La_{1-x}Sr_xFe_{1-v}Ga_vO_{3-\delta}$.
the first ceramic compound is $La_{0.6}Sr_{0.4}Fe_{0.9}Ga_{0.1}O_{3-\delta}$ and the second ceramic compound is $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$.
the hollow core comprises a composite matrix of the first polymeric binder and the particles of the first ceramic compound.
the sheath comprises a composite matrix of the second polymeric binder and the particles of the second ceramic compound.
weight ratios of ceramic particles to binder in the core and in the sheath are in a range of from about 5.0:1.0 to about 12.0:1.
an outside diameter of the fiber is in a range from about 150 to 6,000 μm.
the sheath composite matrix comprises a majority of particles of the second ceramic compound, a minority of particles of the first compound, and the polymeric binder.
the core composite matrix comprises a majority of particles of the first ceramic compound, a minority of particles of the second compound, and the polymeric binder.
an outside diameter of the sintered fiber is in a range from about 105-4,200 μm
a ratio of the outside-diameter to the inside-diameter of the sintered fiber is in a range of from about 1.20:1.0 to about 3.0:1.0.
said ceramic fiber is gas-tight.
the sheath of the ceramic fiber is gas-tight.
the core of the ceramic fiber is not gas-tight.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
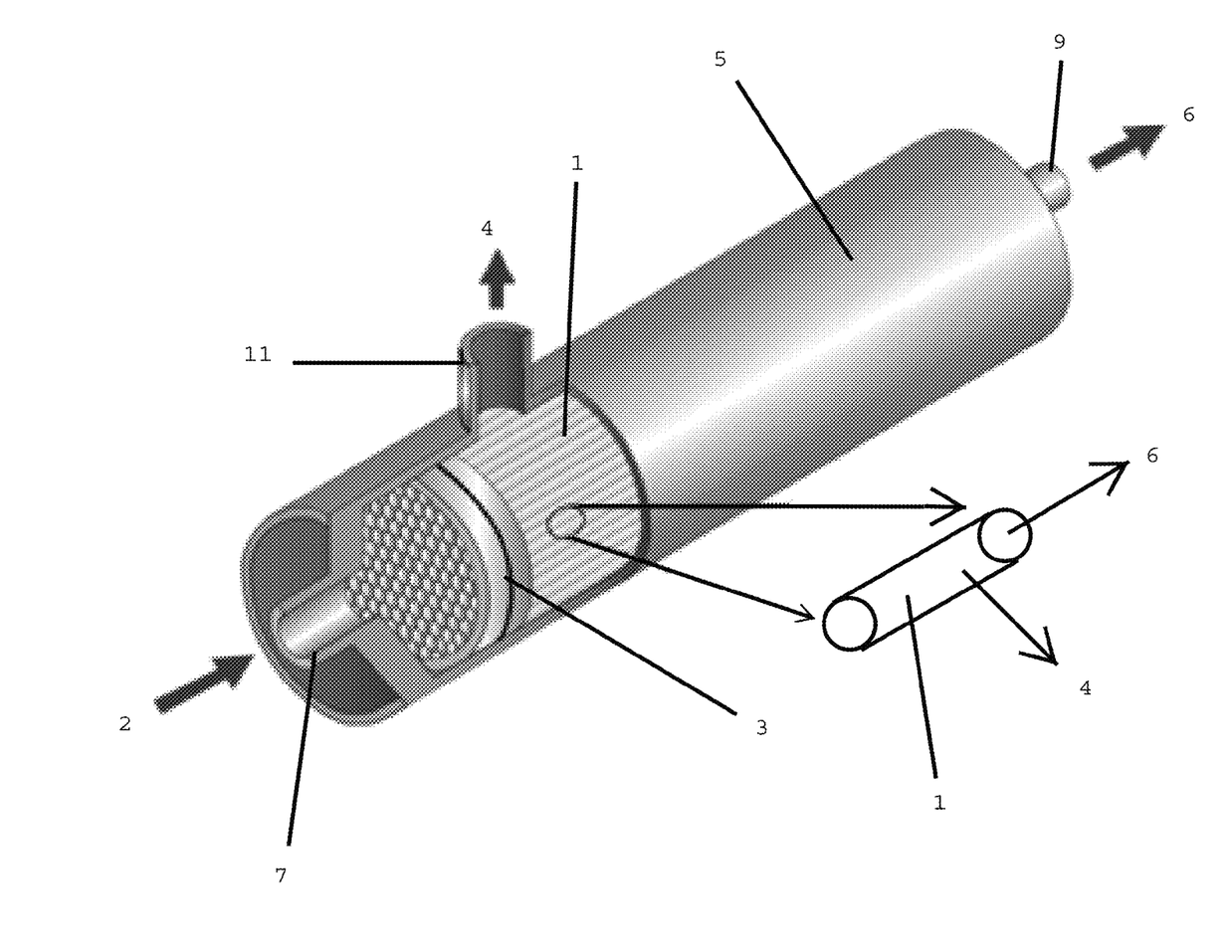
The FIGURE is a schematic of a gas separation module utilizing the composite hollow fibers of the present invention.

The composite hollow ceramic fiber of the present invention includes a sheath portion surrounding a hollow core portion. A bore extends axially through the core portion.

The core portion has an interconnecting network of pores and is not gas-tight. It is formed of a first ceramic compound. The relatively high porosity of the core portion allows relatively high flux between the outer and inner surfaces of the core portion.

In contrast, the sheath portion is dense and non-porous and is gas-tight. It is formed of a second ceramic compound which is a mixed oxide conducting material. Thus, at elevated temperatures it has the property of conducting oxygen ions or protons between its surfaces based upon the difference in partial pressures of the gas of interest between the two membrane sides. Due to the gas-tightness of the sheath and the oxygen ion or proton conducting properties of the second ceramic compound, the sheath provides a gas separation layer of near-infinite, if not infinite, selectivity.

The core and sheath work in tandem to provide a sufficiently high flux of oxygen or hydrogen across the membrane.

The presence of the interconnecting network of pores in the core allows molecular oxygen or molecular hydrogen to flow through the network of pores. Due to this mechanism, the flux of oxygen or hydrogen across the membrane is not highly dependent upon the thickness of the core. Acting as the support for the sheath, the core is formed with a thickness sufficient to provide a mechanical strength suitable for withstanding processing and operation.

While the sheath may contain a certain degree of porosity, the pores do not interconnect to establish an open path through which molecular oxygen or hydrogen may flow. Thus, the sheath is gas-tight. Because the flux of oxygen or hydrogen across the membrane is highly dependent upon the thickness of the sheath, a relatively thin sheath is formed on the core.

Typically, the composite hollow ceramic fiber has an outer diameter of 105-4,200 μm, and inner diameter of 35-1,400 μm, a core thickness of 35-1,400 μm, and a sheath thickness of 2-50 μm. More typically, the composite hollow ceramic fiber has an outer diameter of 1,000-2,000 μm and a combined core and sheath thickness of 200-700 μm. A ratio of the outside-diameter of the composite hollow ceramic fiber to the inside-diameter is in a range of from about 1.20:1.0 to about 3.0:1.0.

Thus, the combination of the relatively thicker, porous, and non-gas-tight core and the thin, dense, gas-tight sheath allows a sufficiently high level of flux without sacrificing mechanical strength. This feature of the invention provides a decided advantage over conventional monolithic hollow fiber membranes made of mixed oxide conducting ceramics. In order to match the flux of the oxygen or hydrogen across the membrane of the invention, the wall thickness of monolithic fibers formed from the second ceramic compound would need to be reduce to such a small level that the result fiber would no longer have the requisite strength to resist breaking or cracking during processing or operation. On the other hand, if such hypothetical monolithic fibers were formed from the second compound with a wall thickness having the requisite strength, the flux of the oxygen or nitrogen across such a membrane would be undesirably low.

The first ceramic compound may be any ceramic compound known in the ceramic fiber or ceramic membrane art. While the first ceramic compound may also be an oxygen ion or proton mixed oxide conducting compound, it is not necessary to the invention. Typically, the first ceramic compound is one that is chemically similar to or compatible with the second ceramic compound or is part of a composite that is compositionally similar to the second ceramic compound in order to reduce the risk of delamination of the sheath from the core during sintering of the green fiber.

Towards this end and in one embodiment, either of the sheath or the core may be comprised of a composite of the first and second ceramic compounds. Additionally, each of the sheath and the core may be comprised of a mixture of the first and second ceramic compounds, wherein each mixture has a different proportion of the first and second ceramic compounds. If a mixture of the two compounds comprises the core, the first ceramic compound comprises a major fraction of the mixture. If a mixture of the two compounds comprises the sheath, the second ceramic compound comprises a major fraction of the sheath. Due to the compositional similarity of the blends, greater adhesion of the sheath to the core may be achieved. Additionally, the compositional similarity will tend to lead to similar coefficients of thermal expansion for the sheath and core. This addresses the potential problem of creep. When the sintered fiber is heated, a sufficiently large difference in coefficient of thermal expansion between the core and the sheath might cause delamination of the sheath from the core due to greater axial expansion of the core versus the sheath or of the sheath versus the core. By using a mixture of the first and second ceramic compounds, the coefficient of thermal expansion for one of the core and sheath will tend to be similar to that of the other of the core and the sheath. However, it should be noted that at least some compositional dissimilarity between the core and sheath must be included. In other words, the sheath and core are not formed of the same exact composition.

The different morphologies of the core and sheath (interconnecting network of pores in the core and dense, gas-tight layer of the sheath) may be produced by a two-step process. First, the green fiber is heated under conditions sufficient high to drive off or pyrolize the binder but not substantially sinter the first or second ceramic compound. One of ordinary skill in the art will recognize that at least some sintering of the first and second ceramic compounds occurs at the temperature(s) at which the binder and optional pore formers are burned off. Otherwise, the particles of the first or second ceramic compounds would not cohere and the fiber would disintegrate. The burning off of the binder and optional pore former creates a relatively high degree of porosity in the sheath and the core. More particularly, the pores are interconnected so that neither the sheath nor the core is gas-tight. Second, the binderless green fiber is heated under conditions sufficient to sinter the second compound and densify the sheath but not fully sinter the first compound. These conditions are satisfied by using a first ceramic compound that has a melting temperature higher than that of the second ceramic compound. Typically, the difference between the melting temperatures of the first and second ceramic compounds is at least 50° C., but smaller differences are still within the scope of the invention. Thus, the core will continue to have an interconnecting network of pores, but the corresponding interconnected pores in the binderless sheath will be closed off and at least partially filled. This yields a dense, non-porous or micro-porous yet gas-tight sheath and a non-gas-tight, relatively highly porous core.

As mentioned above, in an embodiment of the invention, a mixture of the first and second ceramic compounds may be used in the core or the sheath. Alternatively, mixtures of the first and second ceramic compounds may be used for both the core and sheath where each mixture contains different proportions of the first and ceramic compounds. The two-step sintering process described above may still be used to achieve the different morphologies of the core and sheath. In this case, the greater proportion of second ceramic compound in the sheath (in comparison to the first ceramic compound) still results in densification of the sheath during sintering of the binderless green fiber that yields a gas-tight sheath. Although a certain degree of sintering of the second compound is experienced in the core, the relatively greater proportion of the first ceramic compound in the core allows substantial maintenance of the interconnecting network of pores in the core. As a result, the morphologies of the core and sheath in the final fiber are still different.

Formation of the Hollow Ceramic Fibers

Typically, the hollow ceramic fibers of the present invention are made according to the following steps. A first suspension is prepared that includes particulate first ceramic compound (or a blend of the first and second ceramic compounds), a polymeric binder, a solvent for the polymeric binder (and optionally one or more additives such as a pore former and/or a dispersing agent). A second suspension is also prepared that includes particulate second ceramic compound (or a blend of the first and second ceramic compounds), a polymeric binder, a solvent for the polymeric binder (and optionally one or more additives such as a dispersing agent). The first and second suspensions are continuously extruded nascent hollow fibers from a spinnerette.

Numerous spinnerette assemblies have been devised for the production of multi-component hollow fibers of the sheath/core type. Particularly, devices have been proposed for ensuring uniform supply of homogenous fiber-forming liquid suspension and sheath liquid suspension to the orifices of a spinnerette with the object of producing hollow fibers identical dimensions. These spinnerettes use a means for supplying the bore fluid positioned in the spinning orifice for forming the hollow fiber. Usually, a tube is used for this purpose and a bore fluid is injected from the tube into the bore of the fiber being formed to maintain the shape of the fiber until the polymeric materials making up the fiber are coagulated or solidified. Typical spinnerette assemblies are described by UK 830,441, U.S. Pat. Nos. 3,458,615, 4,493,629, and U.S. Pat. No. 5,799,960, the contents of which are incorporated herein in their entirety.

Regardless of the particular spinnerette used, the second suspension is extruded as a thin annulus from a circumferential portion of the spinnerette die to form the nascent sheath. The first suspension is extruded as a thick annulus within the thin annulus of the extruded second suspension and surrounding the tube from which bore fluid is injected. Bore fluid injected through this tube forms a continuous fluid stream within the bore of the nascent core. The bore fluid is preferably water, but a mixture of water and an organic solvent (for example NMP) may be used as well.

Typical spinning and downstream processing techniques are disclosed by US 2010/0018394 A1, the contents of which are incorporated herein in their entirety.

The nascent hollow fiber is passed from the spinnerette through an air gap and then immersed in a liquid coagulant to facilitate phase inversion. The fiber is then withdrawn from the coagulant and wound onto a take-up roll. The wound fiber is then washed to remove residual solvent. Finally, the washed fiber is dried to remove volatile material.

Typically, the dried, unsintered composite hollow fiber has an outer diameter of 150-6,000 µm, and inner diameter of 50-2,000 µm, a core thickness of 50-2,000 µm, and a sheath thickness of 3-70 µm. More typically, the composite hollow ceramic fiber has an outer diameter of 1,400-2,850 µm and a combined core and sheath thickness of 285-1,000 µm.

Polymeric Binders

Suitable types of binders include any of the polymers used in the art of hollow fiber-based gas separation membranes. Typically, the polymeric binders are glassy polymers. Especially typical binders are those disclosed in US 20100018394, the disclosure of which is incorporated herein in its entirety. The binders of US 201000018394 include certain soft-segment/hard-segment copolymers. A "soft segment" is defined as any monomer that can be used to synthesize a homopolymer exhibiting a glass transition temperature, $T_g$-soft, in the range from −60 to +10° C. wherein such homopolymers would act as elastomers at temperatures above $T_g$-soft. A "hard segment" is defined as any monomer that can be used to synthesize a homopolymer exhibiting a glass transition temperature, $T_g$-hard, above +40° C., wherein such homopolymers would act as a hard glassy material below $T_g$-hard. The percentage by weight of soft-segments present in the copolymer is preferably in the range of 50-95%, and most preferably in the range of 60-90%.

A non-limiting list of the soft-segment/hard-segment copolymers includes: poly(ether)urethane-block-polyurethane block copolymers, poly(ether)urethane-block-polyurea block copolymers, poly(ester)urethane-block-polyurethane block copolymers, and poly(ester)urethane-block-polyurea block copolymers. One of ordinary skill in the art will recognize that a block copolymer consists of two or more chemically distinct macromolecular portions (i.e., blocks) joined together to form a single macromolecule.

The following commercially available block copolymers suitable as the polymeric binder include the following: Lycra L-162 from DuPont, Elastollan 1180A from BASF, Estane 5714 from Noveon, Estane 5708 from Noveon.

Solvent and Pore Formers

The solvent to be used in the preparation of the polymer solution should be a good solvent for the organic polymer, should provide a stable suspension of the inorganic particles, and should be compatible with the overall fiber spinning process. Solvents such as N-methylpyrrolidone (NMP), N,N-dimethylacetamide (DMAC), N,N-dimethylformamide (DMF), dimethyl sulfoxide (DMSO), gamma-butyrolactone (BLO) and glycol ethers or esters are particularly useful with the polymers of this invention.

If the polymeric binder in the core of the green fiber does not produce enough porosity during sintering, or if the pores collapse to yield no interconnecting network of pores, pore formers may be included in the first suspension from which the core is formed. The pore formers are insoluble in the solvent. Typically, the pore formers are polymeric materials. These polymeric materials typically are burned off later at temperatures higher than that of the binder. Thus, they form pores closer in time to the sheath densification and thus are more likely to withstand pore collapse in comparison to the binder polymers that are driven off earlier in the heat treatment process and which may collapse prior to sheath densification. The pore formers generally have a diameter of 5 to 50 µm. During burnoff, they create voids of a sufficiently large size to withstand collapse. A suitable particulate pore former is polyethylene.

Ceramic Compounds

The first ceramic compound may be any ceramic compound known in the ceramic fiber or ceramic membrane art that has a melting point higher than that of the second ceramic compound. While the first ceramic compound may also be an oxygen ion or proton mixed oxide conducting compound, it is not necessary to the invention. Typically, the first ceramic compound is one that is chemically similar to or compatible with the second ceramic compound in order to maintain adhesion between the core and sheath during formation of the green fiber and to reduce the risk of delamination of the sheath from the core during sintering of the green fiber.

The second ceramic compound may be one of a wide variety of mixed oxide conducting materials that are known in the art as having the property of conducting oxygen or protons and electrons at elevated temperatures. These materials also conduct electrons so as to establish electronic charge neutrality.

When the hollow composite ceramic fibers are intended for the separation of oxygen from an oxygen-containing gas or for facilitating an oxidative reaction such as partial oxidation of light hydrocarbons such as methane, any one of a wide variety of oxygen-conducting mixed oxide oxygen ion conducting ceramics known in the art may be used in practice of the invention. A non-limiting list of typical ceramics suitable for use in the invention include perovskites of formula (I):

$$[Ma_{1-x-u}Ma'_xMa''_u][Mb_{1-y-v}Mb'_yMb''_v]O_{3-\delta} \quad (I)$$

in which:

Ma represents an atom chosen from scandium, yttrium, or from the families of lanthanides, actinides or alkaline-earth metals;

Ma', which is different from Ma, represents an atom chosen from scandium, yttrium or from the families of lanthanides, actinides or alkaline-earth metals;

Ma", which is different from Ma and Ma', represents an atom chosen from aluminum (Al), gallium (Ga), indium (In), thallium (Tl) or from the family of alkaline-earth metals;

Mb represents an atom chosen from transition metals;

Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);

Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0 < x \leq 0.5$;
$0 \leq u \leq 0.5$;
$(x+u) \leq 0.5$;
$0 \leq y \leq 0.9$;
$0 \leq v \leq 0.9$;
$0 \leq (y+v) \leq 0.9$; and
$\delta$ is such that the structure in question is electrically neutral.

The second ceramic compound is more particularly chosen from compounds of formula (I) in which u is equal to zero or else from compounds of formula (I) in which u is different from zero or else from compounds of formula (I) in which the sum (y+v) is equal to zero or else from compounds of formula (I) in which the sum (y+v) is different from zero.

As a typical example of formula (I) as defined above, Ma is more particularly chosen from La, Ce, Y, Gd, Mg, Ca, Sr and Ba. In this case, the second ceramic compound is preferably a compound of formula (Ia):

$$La_{(1-x-u)}Ma'_xMa''_uMb_{(1-y-v)}Mb'_yMb''_vO_{3-\delta} \quad (Ia),$$

in which Ma represents a lanthanum atom.

In formula (I) as defined above, Ma' is more particularly chosen from La, Ce, Y, Gd, Mg, Ca, Sr and Ba. In this case, the second ceramic compound is preferably a compound of formula (Ib):

$$Ma_{(1-x-u)}Sr_xMa''_uMb_{(1-y-v)}Mb'_yMb''_vO_{3-\delta} \quad (Ib),$$

in which Ma' represents a strontium atom.

As another typical example of formula (I) as defined above, Mb is more particularly chosen from Fe, Cr, Mn, Co, Ni and Ti. In this case, the second ceramic compound is preferably a compound of formula (Ic):

$$Ma_{(1-x-u)}Ma'_xMa''_uFe_{(1-y-v)}Mb'_yMb''_vO_{3-\delta} \quad (Ic),$$

in which Mb represents an iron atom.

In formula (I) as defined above, Mb' is more particularly chosen from Co, Ni, Ti and Ga while Mb" is more particularly chosen from Ti and Ga.

The second ceramic compound may also be a compound of formula (Id):

$$La_{(1-x)}Sr_xFe_{(1-v)}Mb''_vO_{3-\delta} \quad (Id),$$

corresponding to formula (II) in which u=0, y=0, Mb represents an iron atom, Ma represents a lanthanum atom and Ma' represents a strontium atom. In formula (II) as defined above, Ma" is more particularly chosen from Ba, Ca, Al and Ga.

The second ceramic compound may also be a compound of formula: $La_{(1-x-u)}Sr_xAl_uFe_{(1-v)}Ti_vO_{3-\delta}$; $La_{(1-x-u)}Sr_xAl_uFe_{(1-v)}Ga_vO_{3-\delta}$; $La_{(1-x)}Sr_xFe_{(1-v)}Ti_vO_{3-\delta}$; $La_{(1-x)}Sr_xTi_{(1-v)}Fe_vO_{3-\delta}$; $La_{(1-x)}Sr_xFe_{(1-v)}Ga_vO_{3-\delta}$ or $La_{(1-x)}Sr_xFeO_{3-\delta}$, where $La_{0.8}Sr_{0.2}Fe_{0.1}O_{3-\delta}$, $La_{0.7}Sr_{0.3}Fe_{0.8}CO_{0.2}O_{3-\delta}$, $La_{0.6}Sr_{0.4}Fe_{0.8}Co_{0.2}O_{3-\delta}$, $La_{0.6}Sr_{0.4}Fe_{0.9}Ga_{0.1}O_{3-\delta}$, or $La_{0.5}Sr_{0.5}Fe_{0.9}Ti_{0.1}O_{3-\delta}$ are most typical.

Another example of a second ceramic compound with a crystal structure of the perovskite type of formula (I) include those of formula (I'):

$$Ma^{(a)}{}_{(1-x-u)}Ma'^{(a-1)}{}_xMa''^{(a'')}{}_uMb^{(b)}{}_{(1-s-y-v)}Mb^{(b+1)}{}_s Mb'^{(b+\beta)}{}_yMb''^{(b'')}{}_vO_{3-\delta} \quad (I'),$$

in which:

a, a−1, a", b, (b+1), (b+β) and b" are integers representing the respective valences of the Ma, Ma', Ma", Mb, Mb' and Mb" atoms; and a, a", b, b", β, x, y, s, u, v and δ are such that the electrical neutrality of the crystal lattice is preserved;

a>1;
a", b and b" are greater than zero;
−2≤β≤2;
a+b=6;
0<s<x;
0<x≤0.5;
0≤u≤0.5;
(x+u)≤0.5;
0≤y≤0.9;
0≤v≤0.9;
0≤(y+v+s)≤0.9;
[u(a"−a)+v(b"−b)−x+s+βy+2δ]=0;
$\delta_{min}<\delta<\delta_{max}$;
$\delta_{min}=[u(a-a")+v(b-b")-\beta y]/2$;
$\delta_{max}=[u(a-a")+v(b-b")-\beta y+x]/2$; and Ma, Ma', Ma", Mb, Mb' and Mb" are as defined above, Mb representing an atom chosen from transition metals capable of existing in several possible valences.

When the hollow composite ceramic fiber is intended for the separation of hydrogen from a hydrogen-containing gas, for the production of hydrogen and carbon dioxide from syngas, or for facilitation of a reductive reaction such as the production of longer-chain hydrocarbons from methane or the dehydrogenation of saturated hydrocarbons, any one of a wide variety of proton-conducting ceramics known in the art may be used in practice of the invention.

A non-limiting list of typical proton-conducting ceramics suitable for use in the invention include: several perovskite-type oxides based on $SrCeO_3$ or $BaCeO_3$, in which some trivalent cations are partially substituted for cerium according to the general formula of $SrCe_{1-x}M_xO_{3-\alpha}$ or $BaCe_{1-x}M_xO_{3-\alpha}$, where M is some rare earth element, x is less than its upper limit of solid solution formation range (usually less than 0.2) and α is such that the compound is electrically neutral. Still other non-limiting, more particular examples include $SrCe_{0.95}Yb_{0.05}O_{3-\alpha}$ (which is a solid solution based on the perovskite-type oxide SrCeO3, in which 5% of Ce is replaced by Yb); $BaCa_{1.18}Nb_{1.82}O_{3-\alpha}$; $BaCe_{0.8}Gd_{0.2}O_{3-\alpha}$; $BaCe_{0.90}Y_{0.10}O_{3-\alpha}$; $Ce_{0.8}M_{0.2}O_{2-\alpha}$ (M=La, Y, Ga, Sm); $Li_2SO_4$; $La_{1.9}Ca_{0.1}Zr_2O_{6.95}$; $SrCe_{0.95}Yb_{0.05}O_{3-\alpha}$; $SrZr_{0.90}Yb_{0.1}O_{3-\alpha}$; and $SrZr_{0.90}Y_{0.1}O_{3-\alpha}$.

As mentioned above, the first ceramic compound may be any ceramic compound known in the ceramic fiber or ceramic membrane art. For example, the first ceramic compound may be alumina, zirconia, or other ceramic materials, or mixtures of the foregoing. Typically, it is also a mixed oxide conducting material. It may also be any one of the ceramic compounds mentioned above for use as the second ceramic compound so long as it has a melting point higher than that of the second ceramic compound. The first ceramic compound may also be present in the core in a mixture of the first and second ceramic compounds where the first ceramic compound comprises a majority of the core. Similarly, the first ceramic compound may also be present in the sheath in a mixture of the first and second ceramic compounds where the second ceramic compound comprises a majority of the sheath.

In one embodiment, the first ceramic compound is $La_{(1-x)}Sr_xFe_{(1-v)}Ga_vO_{3-\delta}$ (such as $La_{0.6}Sr_{0.4}Fe_{0.9}Ga_{0.1}O_{3-\delta}$) and the second ceramic compound is $La_{1-x}Sr_xFe_{1-y}Co_yO_{3-\delta}$ (such as $La_{0.7}Sr_{0.3}Fe_{0.8}CO_{0.2}O_{3-\delta}$ or $La_{0.6}Sr_{0.4}Fe_{0.8}CO_{0.2}O_{3-\delta}$). In another embodiment, the first ceramic compound is $La_{(1-x)}Sr_xFe_{(1-v)}Ga_vO_{3-\delta}$ (such as $La_{0.6}Sr_{0.4}Fe_{0.9}Ga_{0.1}O_{3-\delta}$), the second ceramic compound is $La_{1-x}Sr_xFe_{1-y}Co_yO_{3-\delta}$ (such as $La_{0.7}Sr_{0.3}Fe_{0.8}CO_{0.2}O_{3-\delta}$ or $La_{0.6}Sr_{0.4}Fe_{0.8}CO_{0.2}O_{3-\delta}$) and the sheath is formed from a blend of a minority of the first ceramic compound and a majority of the second ceramic compound. In yet another embodiment, the first ceramic compound is $La_{(1-x)}Sr_xFe_{(1-v)}Ga_vO_{3-\delta}$ (such as $La_{0.6}Sr_{0.4}Fe_{0.9}Ga_{0.1}O_{3-\delta}$), the second ceramic compound is $La_{1-x}Sr_xFe_{1-y}Co_yO_{3-\delta}$ (such as $La_{0.7}Sr_{0.3}Fe_{0.8}CO_{0.2}O_{3-\delta}$ or $La_{0.6}Sr_{0.4}Fe_{0.8}CO_{0.2}O_{3-\delta}$), the core is formed from a blend of a majority of the first ceramic compound and a minority of the second ceramic compound, and the sheath is formed from a blend of a minority of the first ceramic compound and majority of the second ceramic compound.

The particle sizes of the first and second compounds should be small enough to provide a relatively uniform dispersion of the particles in the suspensions from which the polymeric/inorganic precursor hollow fiber will be formed. It should also be small enough to obtain a relatively uniform distribution of the ceramic particles in the unsintered green fiber. Moreover, it should be small enough so that plugging of a spinnerette is avoided. Typically, the maximum grain size will not exceed one tenth of the narrowest gap in the spinnerette through which the suspension travels. The grain size is selected such that at least a highly dense layer in the unsintered green fiber is achieved.

Generally speaking, the median particle size should be less than about 4 μm, preferably less than 2 μm, and more preferably less than 1 μm. Large agglomerates should be reduced to less than about 10 μm and preferably less than about 1 μm. It has been found that a more defect-free hollow fiber can be produced when the average particle size is less than about 1 μm and the particle size distribution is narrow. It is advantageous that the inorganic particles exhibit a narrow distribution in particle size, e.g., at least 99% by volume of the inorganic particles have a particle size between 0.1 μm and 1.0 μm. More particularly, it is desirable to have no particles (agglomerates or grains) above 2 μm. However, the particle size distribution should not be too narrow because the particle packing might otherwise not be optimized and satisfactory sintering might not be achieved. The particle size distribution preferably has the following parameter: 0.2<d50<0.7 μm. Another parameter of the inorganic material to keep in mind is the specific area which preferably is in the range of from 6-28 m²/g.

An especially optimal particle size distribution is one in which no particles exceed 3 μm in size and in which there are two groups of similarly sized particles, i.e., large particles and small particles. This is desirable for achieving a relatively high degree of uniformity of packing and enhanced green density because the smaller sized particles fit in the otherwise empty spaces in between the larger sized particles.

Very fine inorganic particles may be made by various techniques such as by choosing appropriate synthesis conditions and/or by physical size reduction methods well known to those of ordinary skill in the art, such as attrition milling, ball milling, wet-milling, and ultrasonication. When starting from hard agglomerates of a ceramic material, attrition milling may be used. Generally speaking, the best physical size reduction results are achieved when starting with inorganic particles having a generally round shape. This is typically the case for ceramic particles produced by spraying a solution of the ceramic precursor materials in a high temperature flame, for example 1,100° C., produced by an oxy-acetylene burner. A more rounded shape will provide greater, more uniform shearing during physical size reduction as well. Also, a more rounded shape tends to produce organic/inorganic composite fibers with fewer physical defects.

Appropriately sized ceramic particles may be calcined in order to remove undesirable substances adsorbed thereupon. Typically, this is performed by subjecting the inorganic particles to a temperature of 650° C. for 2 hours.

Suspensions

The suspensions containing the polymer, solvent and first and/or second ceramic compounds are typically prepared according to the following steps. The solvent, polymeric binder, and optional additive(s) are added to a high speed, high torque, thermal jacketed attrition mill and mixed. The ceramic compound(s) of interest is added then added in particulate form to the solvent/binder solution and further mixed.

Typically, the concentration of ceramic compounds (total of all ceramic compounds) in the suspension ranges from 65 to 80 wt. %, and the concentration of the polymeric binder ranges from 8 to 12 wt. %, with the remainder being solvent, and optional pore former, plasticizer and/or dispersant. More typically, the first suspension includes 70 to 75 wt. % of the first ceramic compound, while the second suspension includes 75-80 wt. % of the second ceramic compound. Typically, the ratio of ceramic compounds to polymer ranges from about 7:1 to about 12:1. One of ordinary skill in the art will recognize that the upper concentration limit for ceramic compounds in the suspension may be empirically determined without excessive experimentation by slightly varying ceramic compound content and observing the fiber's ability to stay cohesive while being drawn. The upper limit will ultimately depend upon the specific compositions selected for the polymeric binder and ceramic compounds.

While sufficient mixing ordinarily will achieve uniform suspension of the binder, particulate ceramic compounds, and optional pore formers, incorporation of dispersing agents additives such as surfactants and polyelectrolytes also serve to facilitate and maintain uniform suspension. Other optional additives include one or more plasticizers.

Sintering

The dried, washed, wound, solidified fiber (i.e., the "green fiber") may be sintered in processing having two major steps to provide a sintered ceramic fiber. First, the green fiber is heated under conditions sufficient high to drive off or pyrolize the binder and optional pore former but not substantially sinter the first or second ceramic compound. Another term for this is burn-off. One of ordinary skill in the art will recognize that at least some sintering of the first and second ceramic compounds occurs at the temperature(s) at which the binder and optional pore formers are burned off. Otherwise, the particles of the first or second ceramic compounds would not cohere and the fiber would disintegrate. Second, the binderless green fiber is heated under conditions sufficient to sinter the second compound and densify the sheath but not fully sinter the first compound. As described above, these conditions are satisfied by using a first ceramic compound that has a melting temperature higher than that of the second ceramic compound. A scanning electron microscope image may be taken of a cross-section of a representative fiber to determine if the first ceramic compound has not been fully sintered and therefore an interconnecting network of pores is present in the core.

In the case of a green fiber containing $LaSrFeGaO_{3-d}$ (where d is such that the material is electrically neutral) as the second ceramic compound, a typical temperature profile for sintering is as follows:

ramping the temperature from room temperature to 400° C. at a rate of 5° C./min ramping the temperature from 400° C. to 500° C. at a rate of 1° C./min dwell time of one hour at 500° C.

ramping the temperature from 500° C. to 1350° C. at a rate of 5° C./min dwell time of two hours at 1350° C.

The times, temperatures, and temperature ramp rates in the sintering cycle may be optimized based upon the particular polymeric binder and ceramic compounds used as well as the particle size distribution of the particulate ceramics. Thermogravimetric analysis of the organic material may be performed in a manner well known to those skilled in the art to establish the times, temperatures, and temperature ramp rates for the organics burn-off phase of the sintering cycle. Also, generally speaking a relatively small grain size of the inorganic material (and associated high surface area) tends to inhibit removal of the organic material, so in such a case the temperature ramp rates should be relatively lower and the dwell times increased. On the other hand, in the sintering phase, a relatively small grain size (and associated high surface area) will tend to increase the speed of sintering, so the dwell times in such a case should be relatively lower. Dilatometry analysis (also called thermal expansion analysis) of the green fiber may be performed in a manner well known to those skilled in the art to establish the times, temperatures, and temperature ramp rates for the sintering phase of the sintering cycle. In such analysis, the size of a piece of the green fiber is recorded as the temperature is raised. The initiation of sintering is indicated when a very fast decrease of the sample size is recorded. Preferably, the final dwell temperature is at least 1200° C.

Upon completion of sintering, the sheath, and therefore the fiber, is gas-tight. The term "gas-tight" means that if the interior of the fiber is pressurized, no escape of the pressurization gas from the external circumferential surface of the fiber can be detected.

Gas Separation Membrane Module

As best illustrated in the FIGURE, a gas separation membrane module is the so-called "double-ender" type with a zoomed-in portion illustrating the gas separation at the fiber level. The module that includes a plurality of sintered hollow ceramic fibers 1 extending between an upstream tubesheet 3 and a downstream tubesheet (not illustrated) disposed adjacent corresponding upstream and downstream ends of a cylindrically shaped housing 5 as is conventionally known in the gas separation membrane field. The housing 5 has an upstream bore-side port 7 formed at one end and downstream bore-side port 9 at the other end. The housing 5 also has a shell-side port 11 extending from the shell side of the housing 5.

In operation, a flow of feed gas 2 is fed to bore-side port 7. It then flows into the fibers 1 via open upstream ends thereof.

Inside the bores of the fibers 1, molecular oxygen or hydrogen (as the case may be) in the feed gas flows through the interconnecting network of pores in the core and dissociates into oxygen anions ($O^{2-}$) or into protons and electrons, respectively, at the interface of the core and sheath. The oxygen anions or protons (as the case may be) are transported through the sheath to an outer surface of the sheath where they reform as molecular oxygen or hydrogen, respectively, to form a permeate gas 4. The remaining portion of the feed gas travels down the bores of the fibers 1 and out the open downstream ends thereof to form the non-permeate gas 6. The permeate gas 4 is collected from shell-side port 11 while the non-permeate gas 6 is collected from bore-side port 9.

In an alternative arrangement of the "double-ender" module, the feed gas may instead be fed to shell-side port 11, the non-permeate gas 6 may be collected from another shell-side port (not illustrated) disposed on an opposite end of the housing in between the tubesheets, and the permeate gas 4 may be collected from bore-side port 9. A sweep gas may be introduced into bore-side port 7 to lower the partial pressure of the oxygen or hydrogen accumulating on the inside the fibers 1 in order to increase the flux through the fibers 1. If no sweep gas is desired, either or both of port 7 and port 9 can be utilize to collect the permeate gas 6.

Alternatively, the module may be of the so-called "single-ender" type where only the upstream ends of the fibers 1 are open and the downstream closed ends of the fibers 1 terminate in a space defined by inner surfaces of the housing. In this alternative case, there is no need for a downstream tubesheet or a downstream bore-side port. The feed gas is introduced into an interior of the housing 5 adjacent the closed ends of the fibers 1 via shell-side port 11. In this case, no non-permeate gas need be collected or it can be collected from another shell-side port disposed on an opposite end of the housing 5. The permeate gas is collected from the bore-side port 7.

The so-called "single-ender" type of module may be used as an oxidative or reductive reactor. In this case, the feed gas is an oxygen or hydrogen containing gas (as the case may be). The feed gas is the first reactant. The second reactant is introduced into the bore-side port 7. The first and second reactants react on the inner surface of the core to form reaction products. A flow of reaction product is then collected from bore-side port 9.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A process for making a composite hollow fiber, comprising the steps of:
   preparing a first suspension comprising a first polymeric binder, particles of a first ceramic compound, a solvent, and optionally particles of a second ceramic compound;
   preparing a second suspension comprising a second polymeric binder, particles of the second ceramic compound, the solvent, and optionally particles of the first ceramic compound;
   providing a spinnerette adapted and configured to continuously extrude one or more nascent hollow fibers comprising a hollow core formed from the first suspension and a sheath surrounding the core formed from the second suspension;
   immersing the nascent hollow fiber in a liquid coagulant to facilitate phase inversion of the first and second polymeric binders, wherein:
   the first ceramic compound is a mixed oxide conductor;
   the second ceramic compound is a mixed oxide conductor;
   the first ceramic compound is not the same as the second ceramic compound;
   the first ceramic compound has a melting point higher than that of the second ceramic compound; and
   the first and second polymeric binders are the same or different.

2. The process of claim 1, wherein:
   about 65 wt. % to about 80 wt. % of the first suspension is made up by the particles of the first ceramic compound and the optional second ceramic compound and about 8 wt. % to about 12 wt. % of the first suspension is made up by the first polymeric binder;
   about 64 wt. % to about 80 wt. % of the second suspension is made up by the particles of the second ceramic compound and the optional first ceramic compound and about 8 wt. % to about 12 wt. % of the second suspension is made up by the second polymeric binder.

3. The process of claim 1, further comprising the step of passing the nascent hollow fiber from the spinnerette through an air gap.

4. The process of claim 1, wherein the first suspension further comprises pore formers insoluble in the solvent.

5. The process of claim 1, wherein the second ceramic compound is a hydrogen conducting mixed oxide conductor.

6. The process of claim 1, wherein the second ceramic compound is an oxygen conducting mixed oxide conductor.

7. The process of claim 6, wherein the second ceramic compound is a perovskite independently selected from formula (I):

$$[Ma_{1-x-u}Ma'_xMa''_u][Mb_{1-y-v}Mb'_yMb''_v]O_{3-\delta} \qquad (I)$$

in which:
Ma represents an atom chosen from scandium, yttrium, or from the families of lanthanides, actinides or alkaline-earth metals;
Ma', which is different from Ma, represents an atom chosen from scandium, yttrium or from the families of lanthanides, actinides or alkaline-earth metals;
Ma", which is different from Ma and Ma', represents an atom chosen from aluminum (Al), gallium (Ga), indium (In), thallium (Tl) or from the family of alkaline-earth metals;
Mb represents an atom chosen from transition metals;
Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);
$0 < x \leq 0.5$;
$0 \leq u \leq 0.5$;
$(x+u) \leq 0.5$;
$0 \leq y \leq 0.9$;
$0 \leq v \leq 0.9$;
$0 \leq (y+v) \leq 0.9$; and
$\delta$ is such that the structure in question is electrically neutral.

8. The process of claim 7, wherein the second ceramic compound is $La_{1-x}Sr_xFe_{1-y}Co_yO_{3-\delta}$.

9. The process of claim 8, wherein the first ceramic compound is $La_{1-x}Sr_xFe_{1-y}Ga_yO_{3-\delta}$.

10. The process of claim 9, wherein the first ceramic compound is $La_{0.6}Sr_{0.4}Fe_{0.9}Ga_{0.1}O_{3-\delta}$ and the second ceramic compound is $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$.

11. The composite hollow fiber made by the process of claim 1, wherein:
   the hollow core comprises a composite matrix of the first polymeric binder and the particles of the first ceramic compound; and
   the sheath comprises a composite matrix of the second polymeric binder and the particles of the second ceramic compound.

12. The composite hollow fiber of claim 11, wherein weight ratios of ceramic particles to binder in the core and in the sheath are in a range of from about 5.0:1.0 to about 12.0:1.

13. The composite hollow fiber of claim 11, wherein an outside diameter of the fiber is in a range from about 150 to 6,000 µm.

14. The composite hollow fiber of claim 11, wherein the sheath composite matrix comprises a majority of particles of the second ceramic compound, a minority of particles of the first compound, and the polymeric binder.

15. The composite hollow fiber of claim 14, wherein the core composite matrix comprises a majority of particles of the first ceramic compound, a minority of particles of the second compound, and the polymeric binder.

16. A method of making a composite hollow ceramic fiber, comprising the steps of:
   heating the composite hollow fiber of claim 11 under conditions sufficient to drive off the first and second polymeric binders; and
   heating the binderless hollow fiber under conditions sufficient to:
   densify the sheath to gas-tightness and sinter the second ceramic compound;
   but not fully sinter the first ceramic compound.

17. The composite hollow ceramic fiber produced by the method of claim 16, wherein the composite hollow ceramic fiber essentially consists of the sheath surrounding the core.

18. The composite hollow ceramic fiber of claim 17, wherein an outside diameter of the sintered fiber is in a range from about 1,000 to 2,000 µm and a ratio of the outside-diameter to the inside-diameter is in a range of from about 1.20:1.0 to about 3.0:1.0.

19. The composite hollow ceramic fiber of claim 17, wherein said fiber is gas-tight.

20. The composite hollow ceramic fiber claim 17, wherein the sheath is gas-tight.

21. The ceramic hollow fiber of claim 17, wherein the core is not gas-tight.

22. The process of claim 1, wherein no other suspensions are extruded from the spinnerrette.

* * * * *